United States Patent
Marquez et al.

(10) Patent No.: US 10,848,409 B2
(45) Date of Patent: Nov. 24, 2020

(54) DATA-LESS CLOCK COMPENSATION FOR RANGING

(71) Applicant: Apple Inc., Cupertino, CA (US)

(72) Inventors: Alejandro J. Marquez, Sunnyvale, CA (US); Shang-Te Yang, San Jose, CA (US); Mohit Narang, Cupertino, CA (US); Indranil S. Sen, Fremont, CA (US); Joachim S. Hammerschmidt, Mountain View, CA (US); Hung Kwan Oscar Au, Sunnyvale, CA (US); Dineshan Poopalaratnam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/133,943

(22) Filed: Sep. 18, 2018

(65) Prior Publication Data

US 2020/0092191 A1  Mar. 19, 2020

(51) Int. Cl.
| | |
|---|---|
| *H04L 12/26* | (2006.01) |
| *H04W 24/06* | (2009.01) |
| *H04W 72/04* | (2009.01) |
| *H04W 24/08* | (2009.01) |
| *H04W 84/12* | (2009.01) |
| *H04W 88/02* | (2009.01) |

(52) U.S. Cl.
CPC ........... *H04L 43/103* (2013.01); *H04W 24/08* (2013.01); *H04W 72/0446* (2013.01); *H04W 84/12* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 7,139,647 B2 | 11/2006 | Larsen | |
| 8,543,132 B2 * | 9/2013 | Nam | G01S 5/14 455/404.2 |
| 9,222,785 B2 * | 12/2015 | Banin | G01S 5/021 |
| 9,781,566 B1 * | 10/2017 | Rison | H04W 4/023 |
| 10,034,188 B2 * | 7/2018 | Ben-Haim | G01S 5/14 |
| 2009/0270042 A1 * | 10/2009 | Miscopein | H04W 64/00 455/67.11 |
| 2014/0126394 A1 | 5/2014 | Stephens | |
| 2014/0269549 A1 * | 9/2014 | Stephens | H04W 74/0891 370/329 |
| 2015/0029873 A1 * | 1/2015 | Subramanian | G01S 5/14 370/252 |
| 2016/0014711 A1 * | 1/2016 | Aldana | H04W 56/009 370/350 |

FOREIGN PATENT DOCUMENTS

WO  WO-2018048473 A1 *  3/2018  ............ H04W 56/00

* cited by examiner

*Primary Examiner* — Kwand B Yao
*Assistant Examiner* — Xuan Lu
(74) *Attorney, Agent, or Firm* — Kowert, Hood, Munyon, Rankin & Goetzel, P.C.

(57) ABSTRACT

Methods for a data-less ranging procedure may include initiating a ranging procedure via a polling message transmitted at a first time and receiving response messages at second and third times. The time intervals between the first and second time and the second and third times may be pre-defined. A time of flight may be calculated based on the pre-defined time intervals and the first, second, and third times.

20 Claims, 11 Drawing Sheets

DATA-LESS CLOCK COMPENSATION FOR RANGING

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging can provide the distance between one wireless device and another (e.g., the distance between wireless nodes and/or wireless stations). However, in existing wireless communication technologies ranging sensitivity may be bounded by data decode sensitivity. Accordingly, improvements in the field are desired.

SUMMARY

Embodiments described herein relate to ranging between peer devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a data-less ranging procedure may include initiating a ranging procedure via a polling message transmitted at a first time and receiving response messages at second and third times. The time intervals between the first and second time and the second and third times may be pre-defined. A time of flight may be calculated based on the pre-defined time intervals and the first, second, and third times.

For example, in some embodiments, a wireless station may transmit, at a first time, a first message to a neighboring wireless station. The wireless station may then receive, at a second time, a second message from the neighboring wireless station and, at a third time, a third message from the neighboring wireless station. The second message may be transmitted at an expiration of a first pre-determined time period that may start upon receipt of the first message. The third message may be transmitted at an expiration of a second pre-determined time period that starts upon transmission of the second message. The wireless station may determine, based, at least in part, on the first, second, and third times, a time of flight between the wireless station and the neighboring wireless station.

As another example, in some embodiments, a wireless station may receive a first message from a neighboring wireless station at a first time. The wireless station may then transmit, at a second time, a second message to the neighboring wireless station and, at a third time, a third message to the neighboring wireless station. The second message may be transmitted at an expiration of a first pre-determined time period that may start upon receipt of the first message. The third message may be transmitted at an expiration of a second pre-determined time period that starts upon transmission of the second message. In addition, at a fourth instance in time, the wireless station may receive a fourth message from the neighboring wireless station. The fourth message may be transmitted at an expiration of a third pre-determined time period that may start upon receipt of the third message. The wireless station may determine, based, at least in part, on the first, second, third, and fourth instances in times, a time of flight between the wireless station and the neighboring wireless station.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1A:
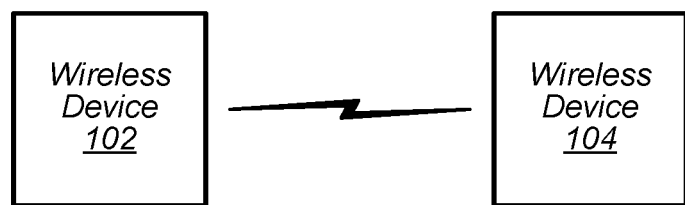
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from AP to UE)
UL: Uplink (from UE to AP)
TX: Transmission/Transmit
RX: Reception/Receive
LAN: Local Area Network
WLAN: Wireless LAN
RAT: Radio Access Technology
TTL: time to live

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
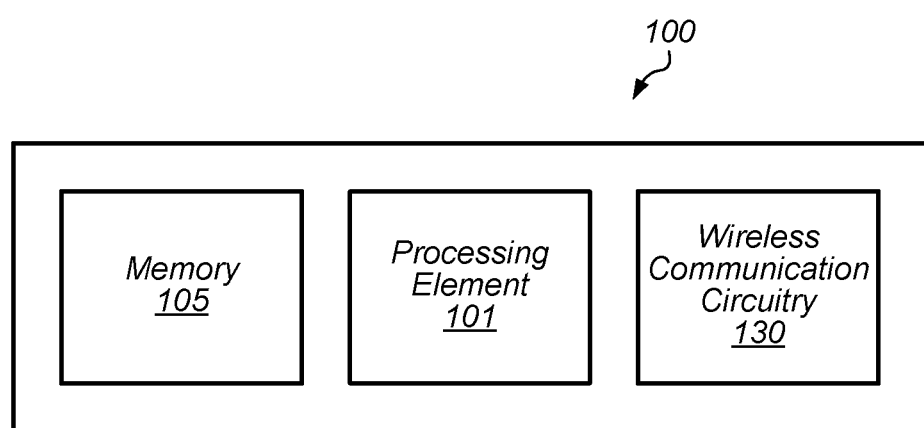
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may transmit, at a first time, a first message to a neighboring wireless device. The wireless device may then receive, at a second time, a second message from the neighboring wireless device and, at a third time, a third message from the neighboring wireless device. The second message may be transmitted at an expiration of a first pre-determined time period that may start upon receipt of the first message. The third message may be transmitted at an expiration of a second pre-determined time period that starts upon transmission of the second message. The wireless device may determine, based, at least in part, on the first, second, and third times, a time of flight between the wireless device and the neighboring wireless device.

As another example, in some embodiments, a wireless device (e.g., either of wireless devices 102 or 104) may receive a first message from a neighboring wireless device at a first time. The wireless device may then transmit, at a second time, a second message to the neighboring wireless device and, at a third time, a third message to the neighboring wireless device. The second message may be transmitted at an expiration of a first pre-determined time period that may start upon receipt of the first message. The third message may be transmitted at an expiration of a second pre-determined time period that starts upon transmission of the second message. In addition, at a fourth instance in time, the wireless device may receive a fourth message from the neighboring wireless device. The fourth message may be transmitted at an expiration of a third pre-determined time period that may start upon receipt of the third message. The wireless device may determine, based, at least in part, on the first, second, third, and fourth instances in times, a time of flight between the wireless device and the neighboring wireless device.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
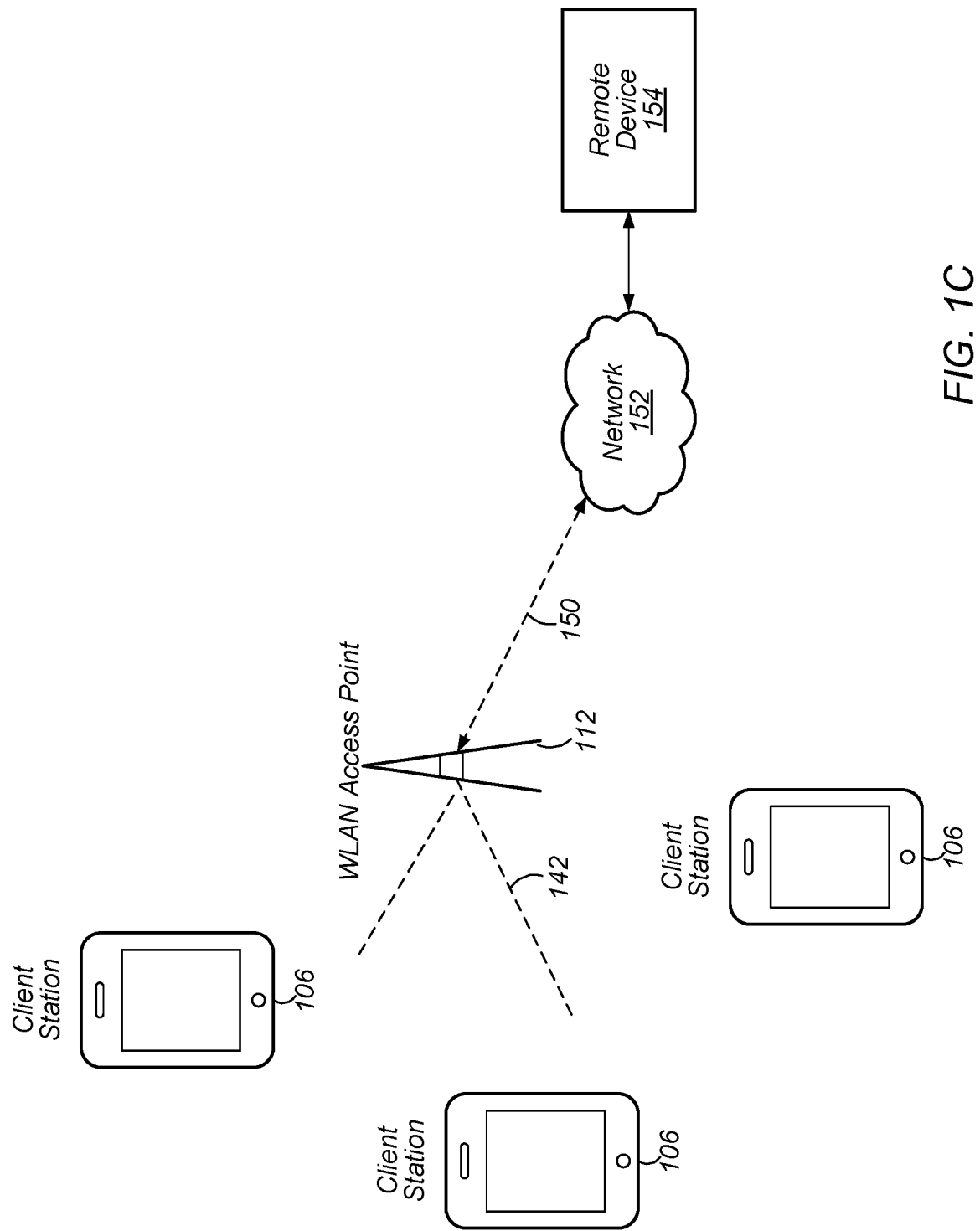
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 (which may be an exemplary implementation of device 100) may be configured to transmit, at a first time, a first message to a neighboring wireless device. The wireless device may then receive, at a second time, a second message from the neighboring wireless device and, at a third time, a third message from the neighboring wireless device. The second message may be transmitted at an expiration of a first pre-determined time period that may start upon receipt of the first message. The third message may be transmitted at an expiration of a second pre-determined time period that starts upon transmission of the second message. The wireless device may determine, based, at least in part, on the first, second, and third times, a time of flight between the wireless device and the neighboring wireless device.

As another example, in some embodiments, a wireless device 106 (which may be an exemplary implementation of device 100) may receive a first message from a neighboring wireless device at a first time. The wireless device may then transmit, at a second time, a second message to the neighboring wireless device and, at a third time, a third message to the neighboring wireless device. The second message may be transmitted at an expiration of a first pre-determined time period that may start upon receipt of the first message. The third message may be transmitted at an expiration of a second pre-determined time period that starts upon transmission of the second message. In addition, at a fourth instance in time, the wireless device may receive a fourth message from the neighboring wireless device. The fourth message may be transmitted at an expiration of a third pre-determined time period that may start upon receipt of the third message. The wireless device may determine, based, at least in part, on the first, second, third, and fourth instances in times, a time of flight between the wireless device and the neighboring wireless device.

Figure 2:
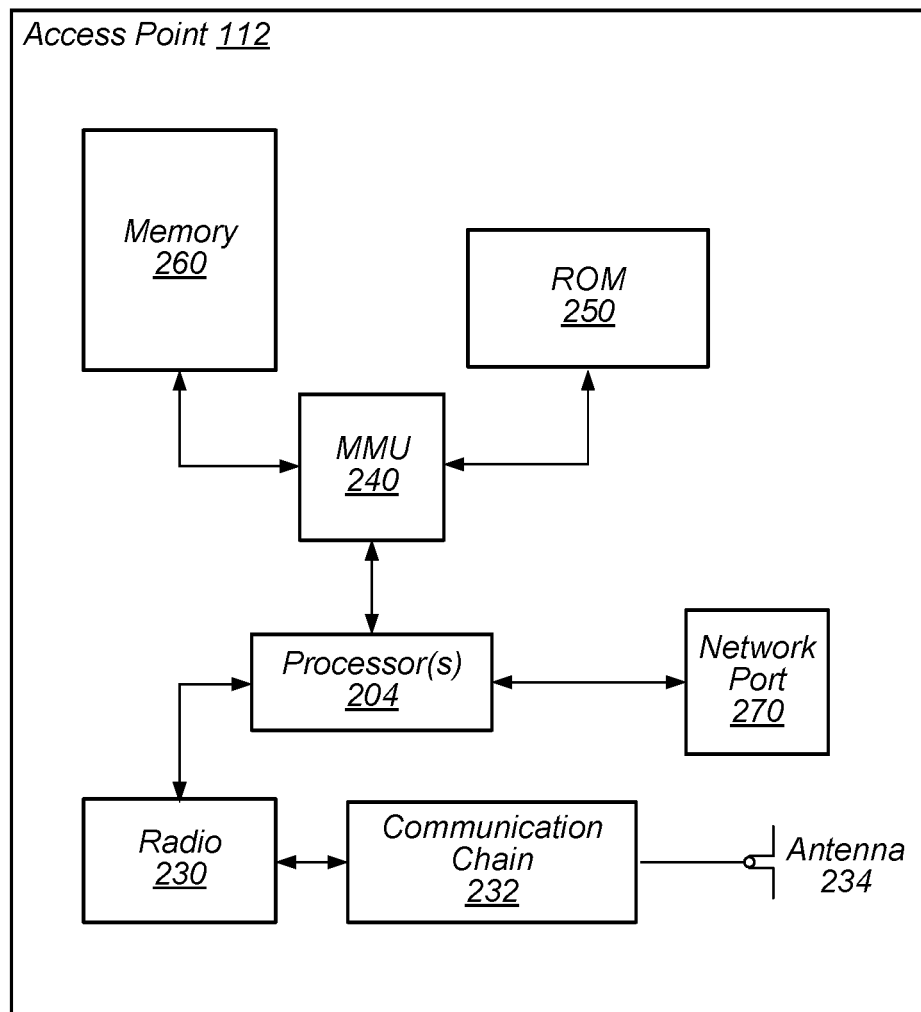
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to transmit, at a first time, a first message to a neighboring wireless device. The AP 112 may then receive, at a second time, a second message from the neighboring wireless device and, at a third time, a third message from the neighboring wireless device. The second message may be transmitted at an expiration of a first pre-determined time period that may start upon receipt of the first message. The third message may be transmitted at an expiration of a second pre-determined time period that starts upon transmission of the second message. The AP 112 may determine, based, at least in part, on the first, second, and third times, a time of flight between the wireless device and the neighboring wireless device.

As another example, in some embodiments, an AP 112 may receive a first message from a neighboring wireless device at a first time. The AP 112 may then transmit, at a second time, a second message to the neighboring wireless device and, at a third time, a third message to the neighboring wireless device. The second message may be transmitted at an expiration of a first pre-determined time period that may start upon receipt of the first message. The third message may be transmitted at an expiration of a second pre-determined time period that starts upon transmission of the second message. In addition, at a fourth instance in time, the AP 112 may receive a fourth message from the neighboring wireless device. The fourth message may be transmitted at an expiration of a third pre-determined time period that may start upon receipt of the third message. The AP 112 may determine, based, at least in part, on the first, second, third, and fourth instances in times, a time of flight between the wireless device and the neighboring wireless device.

Figure 3A:
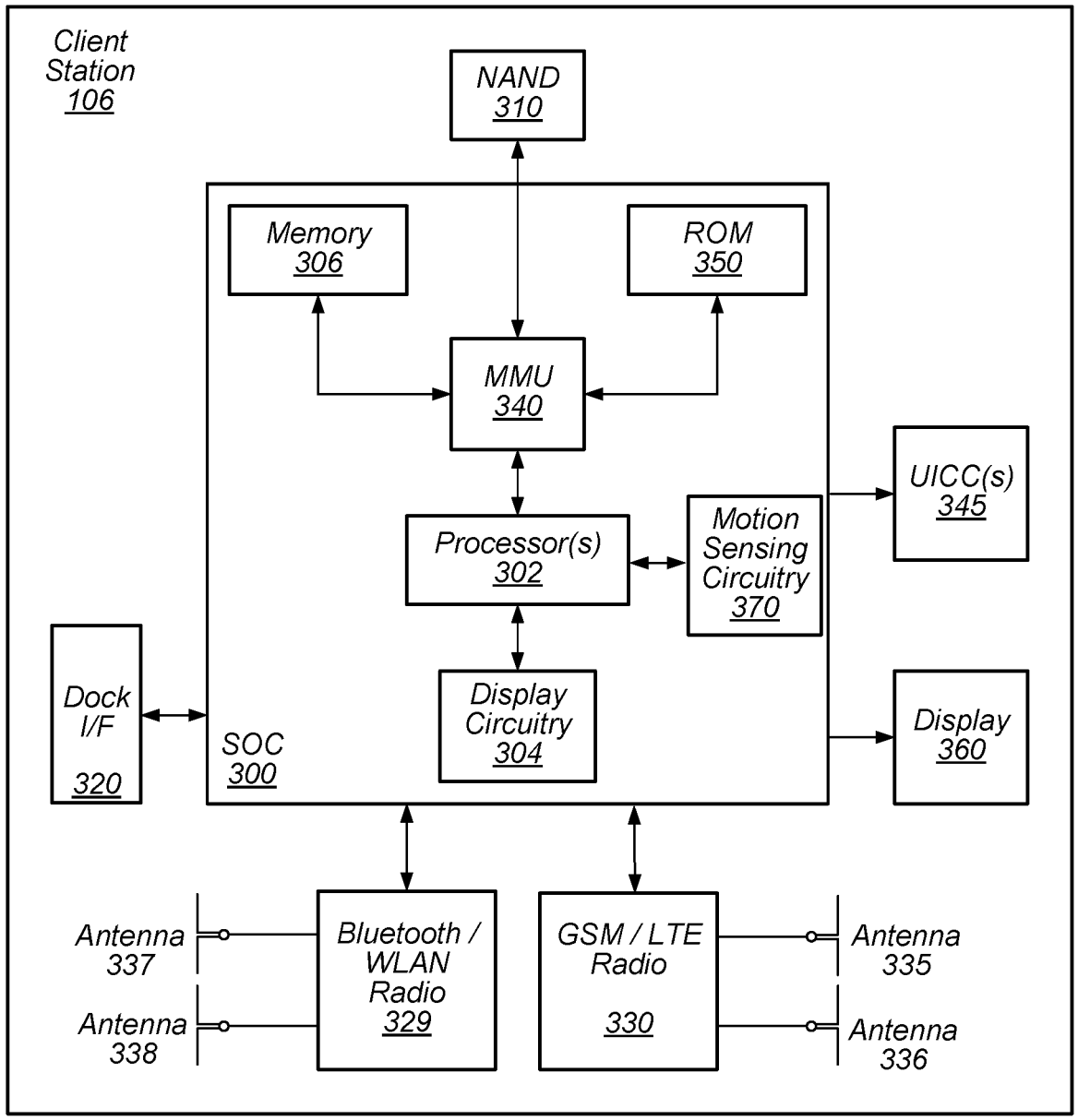
FIG. 3A illustrates an example simplified block diagram of a wireless station (UE), according to some embodiments.

FIG. 3A—Client Station Block Diagram

FIG. 3A illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, as further described below, client station 106 may be configured to transmit, at a first time, a first message to a neighboring wireless device. The client station 106 may then receive, at a second time, a second message from the neighboring wireless device and, at a third time, a third message from the neighboring wireless device. The second message may be transmitted at an expiration of a first pre-determined time period that may start upon receipt of the first message. The third message may be transmitted at an expiration of a second pre-determined time period that starts upon transmission of the second message. The client station 106 may determine, based, at least in part, on the first, second, and third times, a time of flight between the wireless device and the neighboring wireless device.

As another example, in some embodiments, a client station 106 may receive a first message from a neighboring wireless device at a first time. The client station 106 may then transmit, at a second time, a second message to the neighboring wireless device and, at a third time, a third message to the neighboring wireless device. The second message may be transmitted at an expiration of a first pre-determined time period that may start upon receipt of the first message. The third message may be transmitted at an expiration of a second pre-determined time period that starts upon transmission of the second message. In addition, at a fourth instance in time, the client station 106 may receive a fourth message from the neighboring wireless device. The fourth message may be transmitted at an expiration of a third pre-determined time period that may start upon receipt of the third message. The client station 106 may determine, based, at least in part, on the first, second, third, and fourth instances in times, a time of flight between the wireless device and the neighboring wireless device.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Figure 3B:
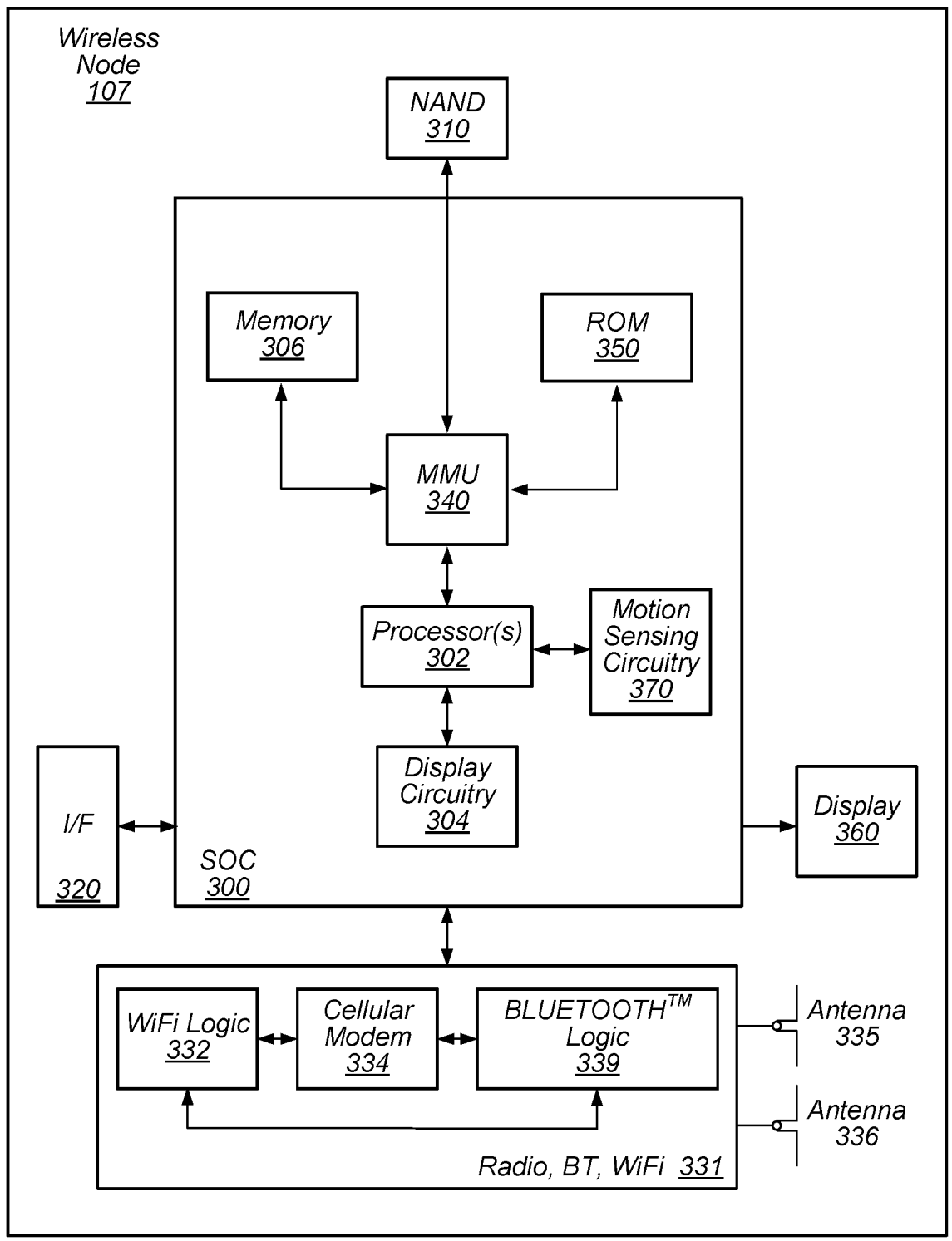
FIG. 3B illustrates an example simplified block diagram of a wireless node, according to some embodiments.

FIG. 3B—Wireless Node Block Diagram

FIG. 3B illustrates one possible block diagram of a wireless node 107, which may be one possible exemplary implementation of the device 100 illustrated in FIG. 1B. As shown, the wireless node 107 may include a system on chip (SOC) 300, which may include portions for various purposes. For example, as shown, the SOC 300 may include processor(s) 302 which may execute program instructions for the wireless node 107, and display circuitry 304 which may perform graphics processing and provide display signals to the display 360. The SOC 300 may also include motion sensing circuitry 370 which may detect motion of the wireless node 107, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor (s) 302.

As shown, the SOC 300 may be coupled to various other circuits of the wireless node 107. For example, the wireless node 107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless node 107 may include at least one antenna, and in some embodiments multiple antennas 335 and 336, for performing wireless communication with base stations and/or other devices. For example, the wireless node 107 may use antennas 33 and 336 to perform the wireless communication. As noted above, the wireless node 107 may in some embodiments be configured to communicate wirelessly using a plurality of wireless communication standards or radio access technologies (RATs).

The wireless communication circuitry 331 may include Wi-Fi Logic 332, a Cellular Modem 334, and Bluetooth Logic 339. The Wi-Fi Logic 332 is for enabling the wireless node 107 to perform Wi-Fi communications, e.g., on an 802.11 network. The Bluetooth Logic 339 is for enabling the wireless node 107 to perform Bluetooth communications. The cellular modem 334 may be capable of performing cellular communication according to one or more cellular communication technologies. Some or all components of the wireless communication circuitry 331 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 331 (e.g., Wi-Fi Logic 332) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, client station 106 may be configured to Wireless Ranging In some implementations, two wireless devices may engage in a ranging operation so that at least one of the wireless devices will be able to determine or estimate the range (e.g., distance) between the two devices, e.g., by measuring an amount of time that it takes to send messages between the devices. For example, the Fine Timing Measurement (FTM) protocol specified in 802.11-2016 may provide a time-of-flight based mechanism to perform ranging between two 802.11/Wi-Fi devices. In FTM, range may be determined as a function of several time instances (t1, t2, t3 and t4), where t1, t2, t3, and t4 correspond to the time of departure and time of arrival of measurement frames sent in both directions (e.g., uplink and downlink) between the two devices (e.g., the two STAs). Standards under development (e.g., 802.11az) may aim to improve and/or optimize the ranging protocols for a variety of use cases, including very high throughput (VHT), high efficiency (HE), and/or 60 GHz communications, among others.

Figure 4:
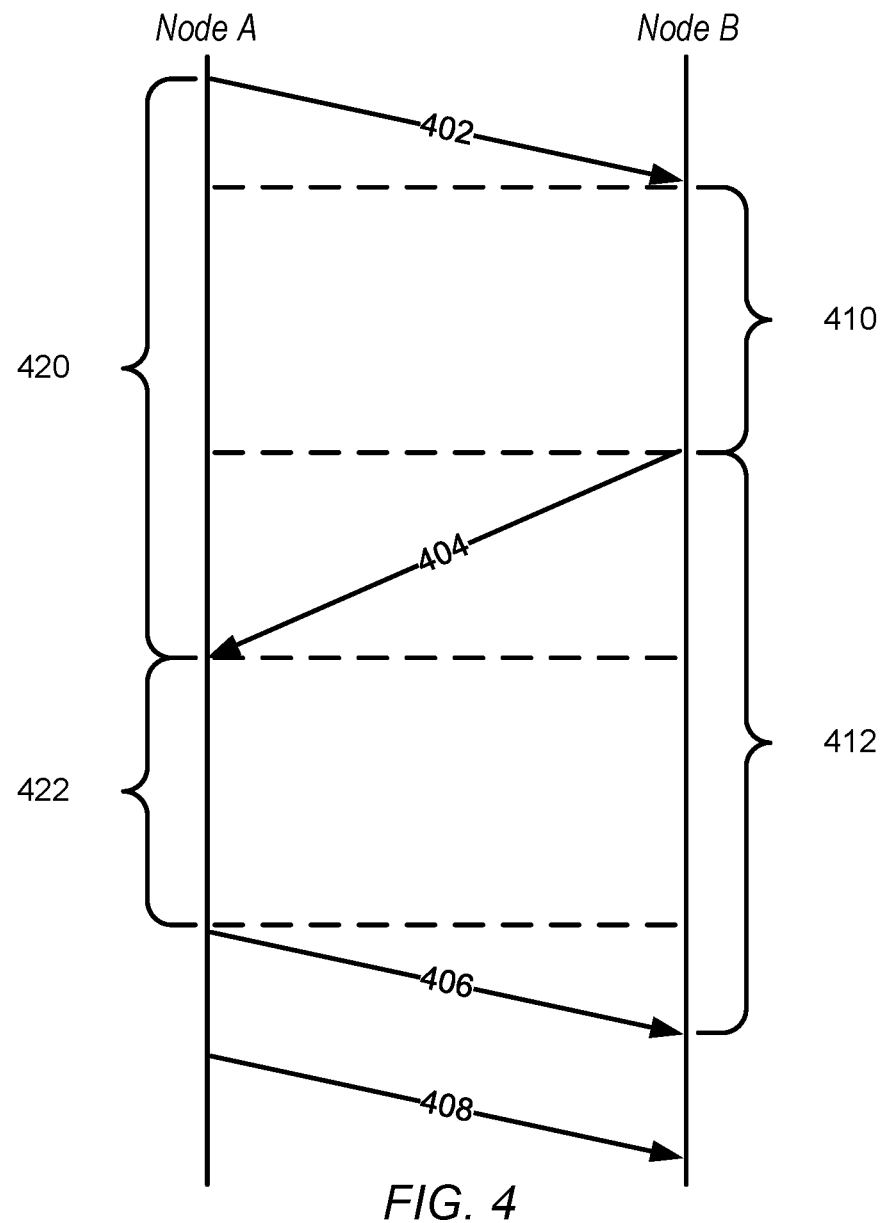
FIG. 4 illustrates a diagram of an example of signaling for a ranging procedure.

In some implementations, for example, as illustrated by FIG. 4, two round trip equations may be used to solve two equations to determine a ranged between devices. As shown, a first device (node A) may transmit a poll message 402 to a second device (node B). The second device may process the poll message over a time period as denoted by 410. After processing, the second device may transmit a response message 404. The first device may receive the response message 404 after a time period 420 as measured from transmission of the poll message 402. The first device may process the response message 404 over a time period 422. After processing, the first device may transmit a final message 406. The second device may receive the final message 406 after a time period 412 as measured from transmission of the response message 404. In addition, the first device may send a data message 408 that includes the time periods 420 and 422. In other words, timestamps (e.g., associated with the time periods 420 and 422) may be included in a payload of data message 408. Based on the time periods 410, 412, 420, and 422, the second device may determine the range between the devices. Since data must be exchanged between the devices in order to determine the range, ranging sensitivity may be bounded by a corresponding data decode sensitivity.

Embodiments described herein provide mechanisms for determining a range between devices without an exchange of data (e.g., timestamps). In some embodiments, such mechanisms may allow for improved system ranging sensitivity as compared to existing implementations. In some embodiments, a pre-negotiated time (e.g., known to both devices in a ranging procedure) may be used (or implemented) to avoid transmission of data (e.g., timestamps as payloads). In some embodiments, each device may measure time using a local clock to form sufficient equations to determine a range. In some embodiments, one inter-packet time may be used to transfer a single timestamp.

Some embodiments may implement a mechanism for identification of a packet without a data payload. In other words, a mechanism may be implemented to allow each device a way to identify a packet that is intended for the device. In some embodiments, a shared-secret based ranging waveform may be used. In some embodiments, a static waveform may be used, e.g., if replay-attack is not a concern (e.g., if a ranging procedure does not require security). In some embodiments, an out-of-band (OOB) mechanism may be used to secure a ranging procedure. For example, a key may be shared over Bluetooth.

Figure 5:
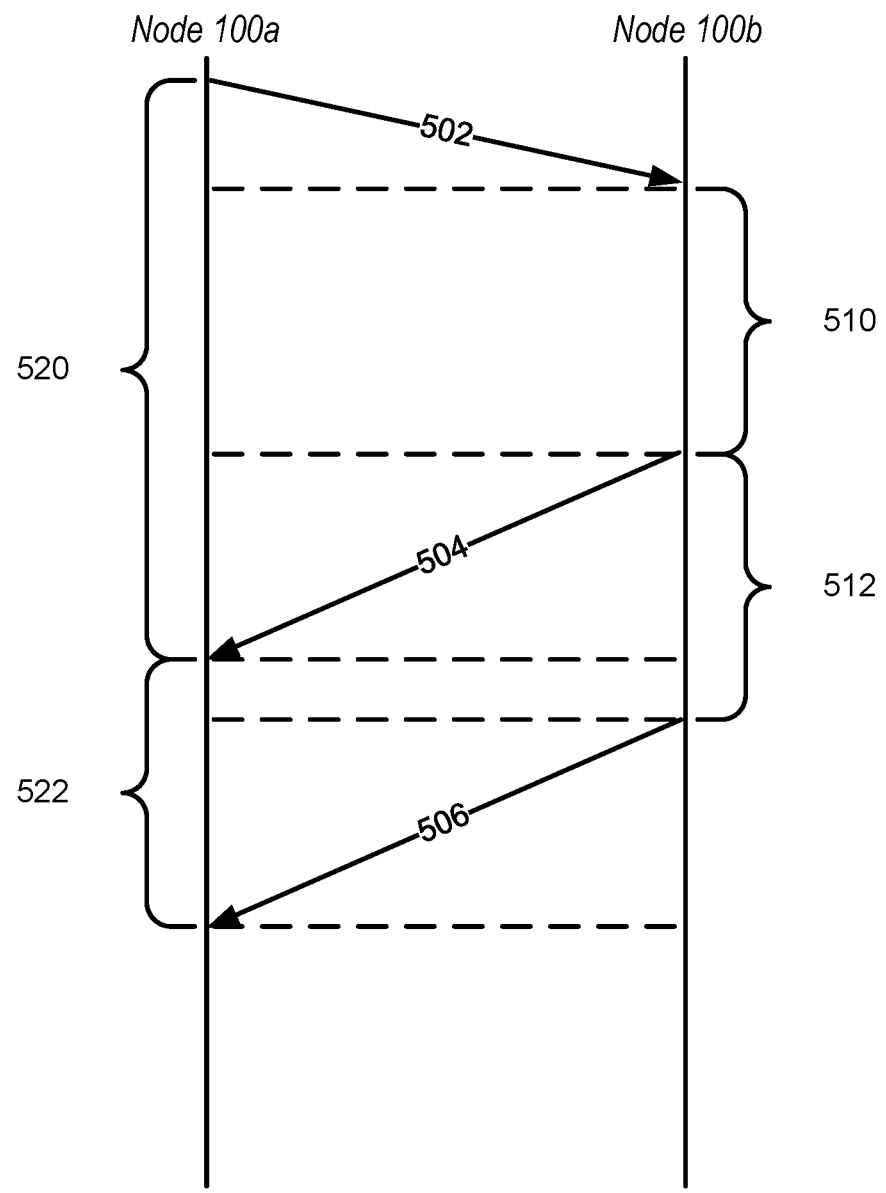
FIG. 5 illustrates a diagram of an example of signaling for a data-less ranging procedure, according to some embodiments.

For example, FIG. 5 illustrates a diagram of an example of signaling for a data-less ranging procedure, according to some embodiments. The signaling shown in FIG. 5 may be used in conjunction with any of the systems or devices shown in the above Figures, among other devices. In various embodiments, some of the signaling elements shown may be performed concurrently, in a different order than shown, or may be omitted. Additional signaling elements may also be performed as desired. As shown, the signaling may proceed as follows.

The ranging procedure may begin with node 100a (which may be a wireless device 100, as described above, e.g., a client station 106 and/or a wireless node 107) transmitting a first message 502 to node 100b (which may be a wireless device 100, as described above, e.g., a client station 106 and/or a wireless node 107). Node 100a may record (e.g., via a timestamp) a time of transmission of the first message 502. In some embodiments, the first message 502 may be a polling message. In some embodiments, the first message 502 may include an identifier indicating that the first message 502 is intended for node 100b.

Upon receipt of the first message 502, node 100b may wait a pre-determined and/or pre-negotiated time period 510 prior to transmitting a second message 504. In some embodiments, the time period 510 may be based, at least in part, on a received timing of the first message 502. In some embodiments, the second message 504 may include an identifier indicating that the second message 504 is intended for node 100a.

Upon receipt of the second message 504, node 100a may determine a first round trip time period 520. In some embodiments, the first round trip time period 520 may be determine based on a comparison of a timestamp associated with transmission of first message 502 and a timestamp associated with receipt of second message 504.

After a time period 512, node 100b may transmit a third message 506 to node 100a. In some embodiments, time period 512 may be a pre-determined and/or pre-negotiated time period after the transmission of second message 504. In some embodiments, time period 512 may be a constant value. In some embodiments, the third message 506 may include an identifier indicating that the third message 506 is intended for node 100a.

Upon receipt of the third message 506, node 100a may determine a second round trip time period 522. In some embodiments, the second round trip time period 522 may be determine based on a comparison of a timestamp associated with receipt of second message 504 and a timestamp associated with receipt of third message 506.

In some embodiments, node 100a may compare the time period 522 to time period 512 to determine (and/or estimate) a difference between a local clock of node 100a and a local clock of node 100b, e.g.:

$$T_{Reply2A}(1+\delta_A)=T_{Reply2B}(1+\delta_B) \qquad (1)$$

where $\delta_A$ is an estimate of a local clock error of node 100a, $\delta_B$ is an estimate of a local clock error of node 100b, $T_{Reply2A}$ is the time period 522, and $T_{Reply2B}$ is the time period 512. Once the difference between the local clocks is determined (and/or estimated), a time of flight, $T_P$, may be determined using time periods 510 and 520, e.g.:

$$T_{Round1A}(1+\delta_A)=T_P T_{Reply1B}(1+\delta_B)+T_P \qquad (2)$$

$$T_P = \frac{T_{Round1A}(1+\delta_A) - T_{Reply1B}(1+\delta_B)}{2} \qquad (3)$$

where $T_{Round1A}$ is the time period 520, $T_{Reply1B}$ is the time period 510, and $T_P$ is the time of flight. Once the time of flight is determined, then a range between nodes 100a and 100b may be determined, e.g., based on the time of flight.

Figure 6:
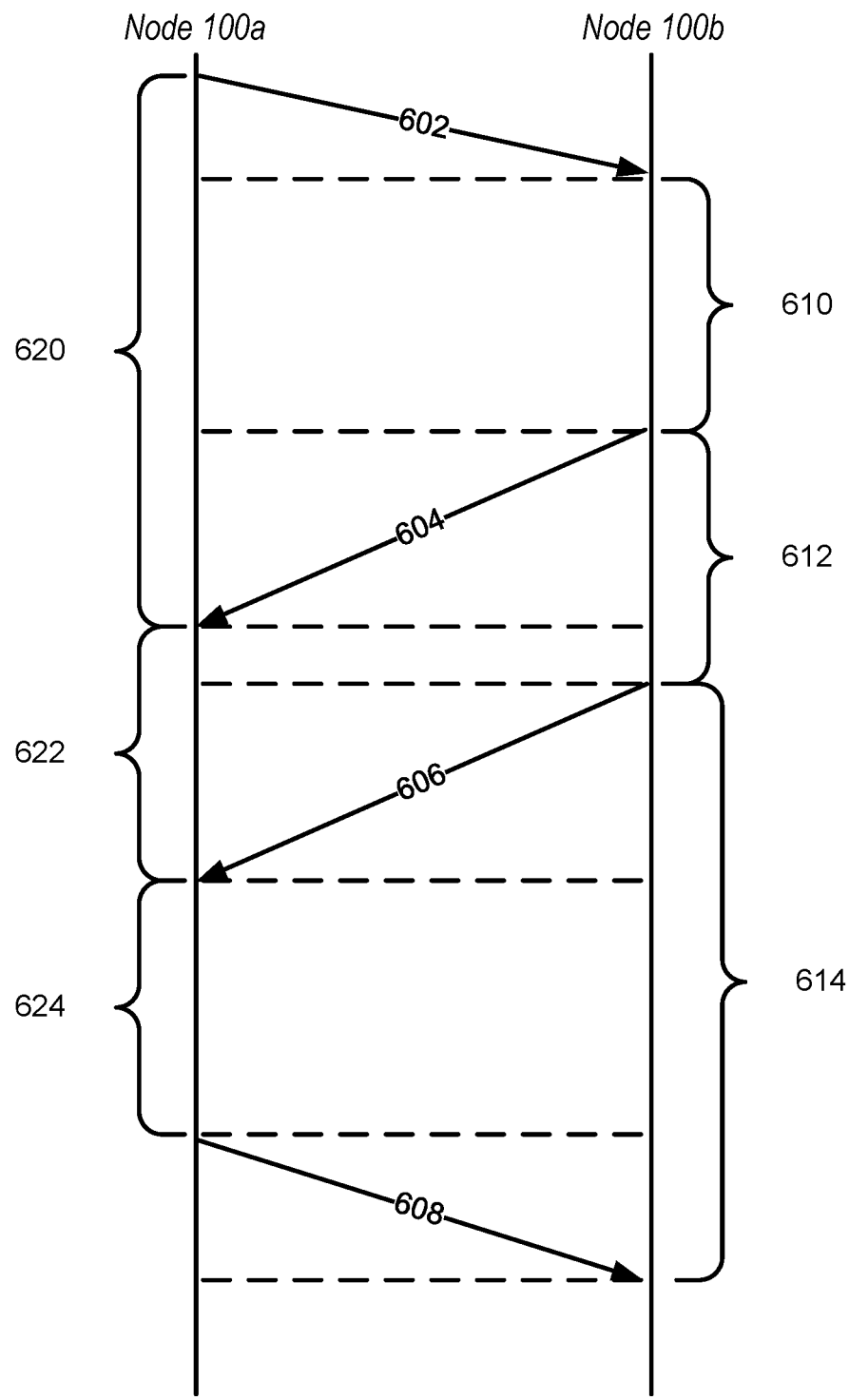
FIG. 6 illustrates a diagram of another example of signaling for a data-less ranging procedure, according to some embodiments.

For example, FIG. 6 illustrates a diagram of another example of signaling for a data-less ranging procedure, according to some embodiments. The signaling shown in FIG. 6 may be used in conjunction with any of the systems or devices shown in the above Figures, among other devices. In various embodiments, some of the signaling elements shown may be performed concurrently, in a different order than shown, or may be omitted. Additional signaling elements may also be performed as desired. As shown, the signaling may proceed as follows.

The ranging procedure may begin with node 100a (which may be a wireless device 100, as described above, e.g., a client station 106 and/or a wireless node 107) transmitting a first message 602 to node 100b (which may be a wireless device 100, as described above, e.g., a client station 106 and/or a wireless node 107). Node 100a may record (e.g., via a timestamp) a time of transmission of the first message 602. In some embodiments, the first message 602 may be a polling message. In some embodiments, the first message 602 may include an identifier indicating that the first message 602 is intended for node 100b.

Upon receipt of the first message 602, node 100b may wait a pre-determined and/or pre-negotiated time period 610 prior to transmitting a second message 604. In some embodiments, the time period 610 may be based, at least in part, on a received timing of the first message 602. In some embodiments, the second message 604 may include an identifier indicating that the second message 604 is intended for node 100a.

Upon receipt of the second message 604, node 100a may determine a first round trip time period 620. In some embodiments, the first round trip time period 620 may be determine based on a comparison of a timestamp associated with transmission of first message 602 and a timestamp associated with receipt of second message 604.

After a time period 612, node 100b may transmit a third message 606 to node 100a. In some embodiments, time period 612 may be a pre-determined and/or pre-negotiated time period after the transmission of second message 604. In some embodiments, time period 612 may be a constant value. In some embodiments, the third message 606 may include an identifier indicating that the third message 606 is intended for node 100a.

Upon receipt of the third message 606, node 100a may determine a second round trip time period 622. In some embodiments, the second round trip time period 622 may be determine based on a comparison of a timestamp associated with receipt of second message 604 and a timestamp associated with receipt of third message 606.

After a time period 624, node 100a may transmit a fourth message 608 to node 100b. In some embodiments, time period 624 may be based, at least in part, on time periods 620 and 622. For example, time period 624 may be the same as time period 620 or may be the same as time period 622. In some embodiments, time period 624 may be the difference between time periods 620 and 622. In some embodiments, the fourth message 608 may include an identifier indicating that the fourth message 608 is intended for node 100b. For example, the time period 624 may be calculated as any of:

$$T_{Reply3A}=T_{Round1A} \qquad (4)$$

$$T_{Reply3A}=T_{Reply2A} \qquad (5)$$

$$T_{Reply3A}=T_{Round1A}-T_{Reply2A} \qquad (6)$$

where $T_{Round1A}$ is the time period 620, $T_{Reply2A}$ is the time period 622, and $T_{Reply3A}$ is the time period 624.

Upon receipt of the fourth message 608, node 100b may determine a third round trip time period 614. In some embodiments, the third round trip time period 614 may be determine based on a comparison of a timestamp associated with transmission of third message 606 and a timestamp associated with receipt of fourth message 608.

In some embodiments, node 100a may compare the time period 622 to time period 612 to determine (and/or estimate) a difference between a local clock of node 100a and a local clock of node 100b, e.g.:

$$T_{Reply2A}(1+\delta_A) = T_{Reply2B}(1+\delta_B) \quad (7)$$

where $\delta_A$ is an estimate of a local clock error of node 100a, $\delta_B$ is an estimate of a local clock error of node 100b, $T_{Reply2A}$ is the time period 622, and $T_{Reply2B}$ is the time period 612. Once the difference between the local clocks is determined (and/or estimated), a time of flight, $T_p$, may be determined using time periods 610 and 620, e.g.:

$$T_{Round1A}(1+\delta_A) = T_P + T_{Reply1B}(1+\delta_B) + T_P \quad (8)$$

$$T_P = \frac{T_{Round1A}(1+\delta_A) - T_{Reply1B}(1+\delta_B)}{2} \quad (9)$$

where $T_{Round1A}$ is the time period 620, and $T_{Reply1B}$ is the time period 610, and $T_P$ is the time of flight. Once the time of flight is determined, then a range between nodes 100a and 100b may be determined, e.g., based on the time of flight.

In addition, in some embodiments, node 100b may compare the time period 622 to time period 612 to determine (and/or estimate) a difference between a local clock of node 100a and a local clock of node 100b, e.g.:

$$T_{Reply2A}(1+\delta_A) = T_{Reply2B}(1+\delta_B) \quad (10)$$

where $\delta_A$ is an estimate of a local clock error of node 100a, $\delta_B$ is an estimate of a local clock error of node 100b, $T_{Reply2A}$ is the time period 622, and $T_{Reply2B}$ is the time period 612. Once the difference between the local clocks is determined (and/or estimated), a time of flight, $T_p$, may be determined using time periods 610, 620, 622, 624, and 614, and any of equations 4, 5, or 6. For example, using equation 6, the time of flight, $T_P$, may be determined:

$$T_{Reply3A} = T_{Round1A} - T_{Reply2A} \quad (6)$$

$$T_{Round1A}(1+\delta_A) = T_P + T_{Reply1B}(1+\delta_B) + T_P \quad (11)$$

$$T_P = \frac{T_{Round1A}(1+\delta_A) - T_{Reply1B}(1+\delta_B)}{2} \quad (12)$$

$$T_{Round2B}(1+\delta_B) = T_P + T_{Reply3A}(1+\delta_B) + T_P \quad (13)$$

$$T_P = \frac{T_{Round1B}(1+\delta_A) - T_{Reply3A}(1+\delta_B)}{2} \quad (14)$$

where $T_{Round1A}$ is the time period 620, $T_{Reply1B}$ is the time period 610, $T_{Round2B}$ is the time period 614, and $T_{Reply2A}$ is the time period 624 and $T_P$ is the time of flight. Once the time of flight is determined, then a range between nodes 100a and 100b may be determined, e.g., based on the time of flight.

Figure 7:
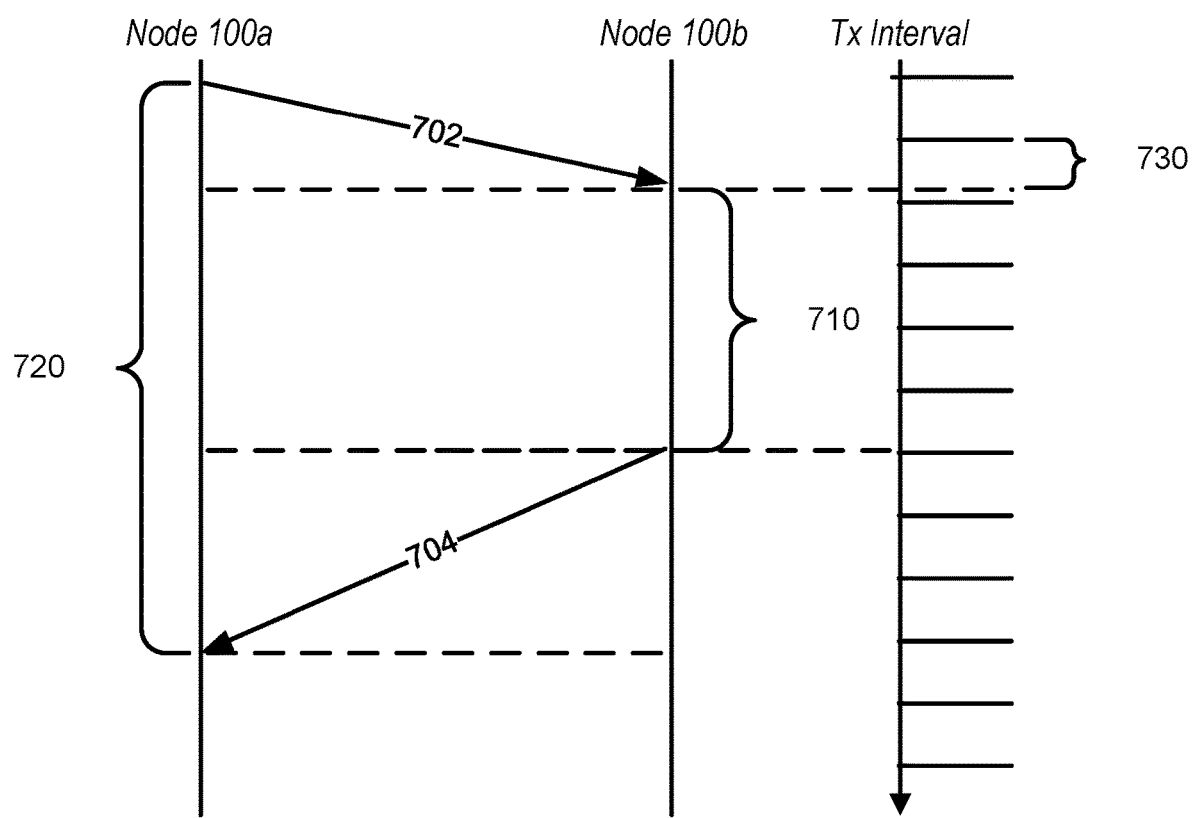
FIG. 7 illustrates a diagram of another example of signaling for a data-less ranging procedure, according to some embodiments.

In some embodiments, nodes may only start a transmission at specific time intervals. Thus, a transmission interval (Tx) of an integrated circuit (e.g., clock) of nodes 100a and 100b may be adjusted via one of a modification to a pulse shape of the integrated circuit and/or adding an offset to the pulse shape of the integrated circuit. For example, FIG. 7 illustrates a diagram of another example of signaling for a data-less ranging procedure, according to some embodiments. The signaling shown in FIG. 7 may be used in conjunction with any of the systems or devices shown in the above Figures, among other devices. In various embodiments, some of the signaling elements shown may be performed concurrently, in a different order than shown, or may be omitted. Additional signaling elements may also be performed as desired. As shown, the signaling may proceed as follows.

As shown, the message 702 may be a polling message such as first messages 502 and 602 described above. In addition, message 704 may be a response message such as second messages 504 and 604 described above. In addition, time period 710 may be a time period such as time periods 510 and 610 described above. Further, time period 720 may be a time period such as time periods 520 and 620 described above. In other words, the signaling shown in FIG. 7 may be similar to or the same as the initial signaling described above in reference to FIGS. 5 and 6. FIG. 7 further illustrates an exemplary integrated circuit (IC) transmission interval pulsing for node 100b. As shown, message 702 may be received between pulses (e.g., receipt of message 702 may be offset from a pulse by time duration 730) and time period 710 may not correspond to an integer number of pulses. Thus, in some embodiments, the IC transmission interval pulsing for node 100b may be adjusted via one of a modification to a pulse shape of the IC and/or adding an offset to the pulse shape of the IC such that time period 710 corresponds to a pre-determined (or pre-defined) time period as described above with reference to FIGS. 5 and 6.

Figure 8:
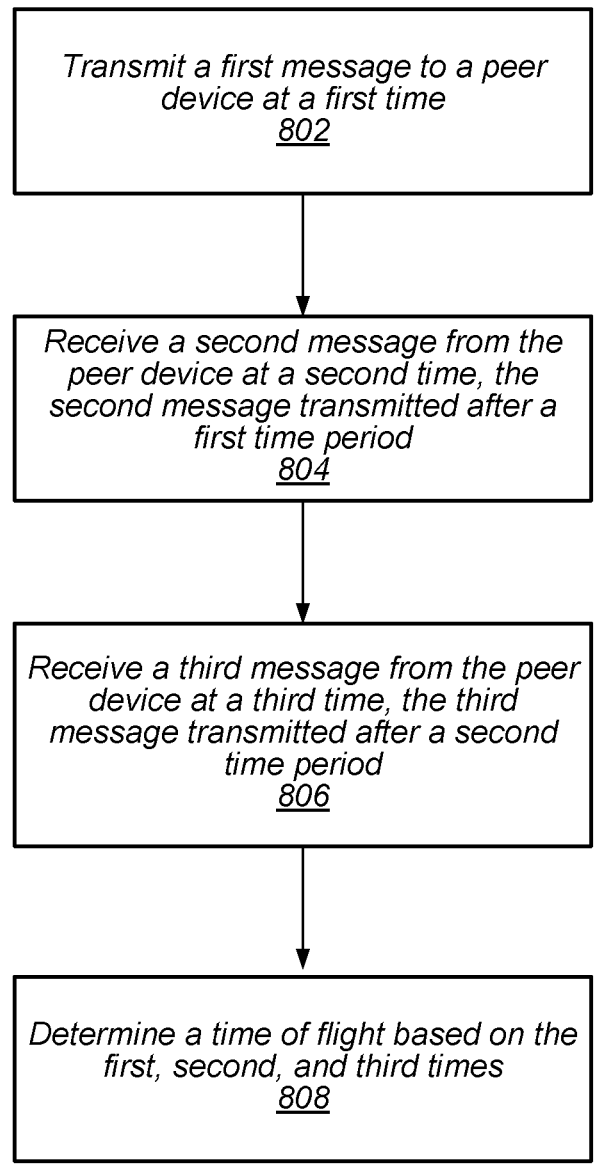
FIG. 8 illustrates a block diagram of an example of a method for a data-less ranging procedure, according to some embodiments.

FIG. 8 illustrates a block diagram of an example of a method for a data-less ranging procedure, according to some embodiments. The method shown in FIG. 8 may be used in conjunction with any of the signaling, methods, systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, a device (e.g., wireless device 100) may transmit a first message to a peer (e.g., neighboring) device (e.g., another wireless device 100). The first message may be transmitted at a first instance in time (e.g., a first time). The first message may be a polling message, e.g., as described above. In some embodiments, the first message may include an indication that the first message is intended for the peer device. In other words, the first message may include information indicating that the message is intended for the peer device.

At 804, the device may receive a second message from the peer device at a second instance in time (e.g., after the first instance in time). The second message may be transmitted after expiration of a time period. The time period may be pre-defined (e.g., via a standardization of the time period and/or via a negotiation of the time period prior to transmission of the first message). The duration of the time period may be from receipt (by the peer device) of the first message to transmission of the second message. In some embodiments, the second message may be a response message. In some embodiments, the second message may include an indication that the second message is intended for the device. In other words, the second message may include information indicating that the message is intended for the device.

At 806, the device may receive a third message from the peer device at a third instance in time (e.g., after the second instance in time). The third message may be transmitted after expiration of a time period. The time period may be pre-defined (e.g., via a standardization of the time period and/or via a negotiation of the time period prior to transmission of the first message). The duration of the time period may be from transmission (by the peer device) of the second message to transmission of the third message. In some embodiments, the third message may be a response message. In some embodiments, the third message may include an indication that the third message is intended for the device. In other words, the third message may include information indicating that the message is intended for the device.

At 808, the device may determine, based, at least in part, on the first, second, and third instances in time, a time of flight between the device and the peer device. In some embodiments, the time of flight may be calculated using an estimated local clock difference between the device and the peer device, a difference between the second instance in time and the first instance in time, and the time period associated with the first and second instances in time, e.g., as described above with reference to equations (1)-(3). In some embodiments, the local clock difference may be estimated based on a comparison of a difference between a difference between the third instance in time and the second instance in time and the time period associated with the second and third instances in time.

Figure 9:
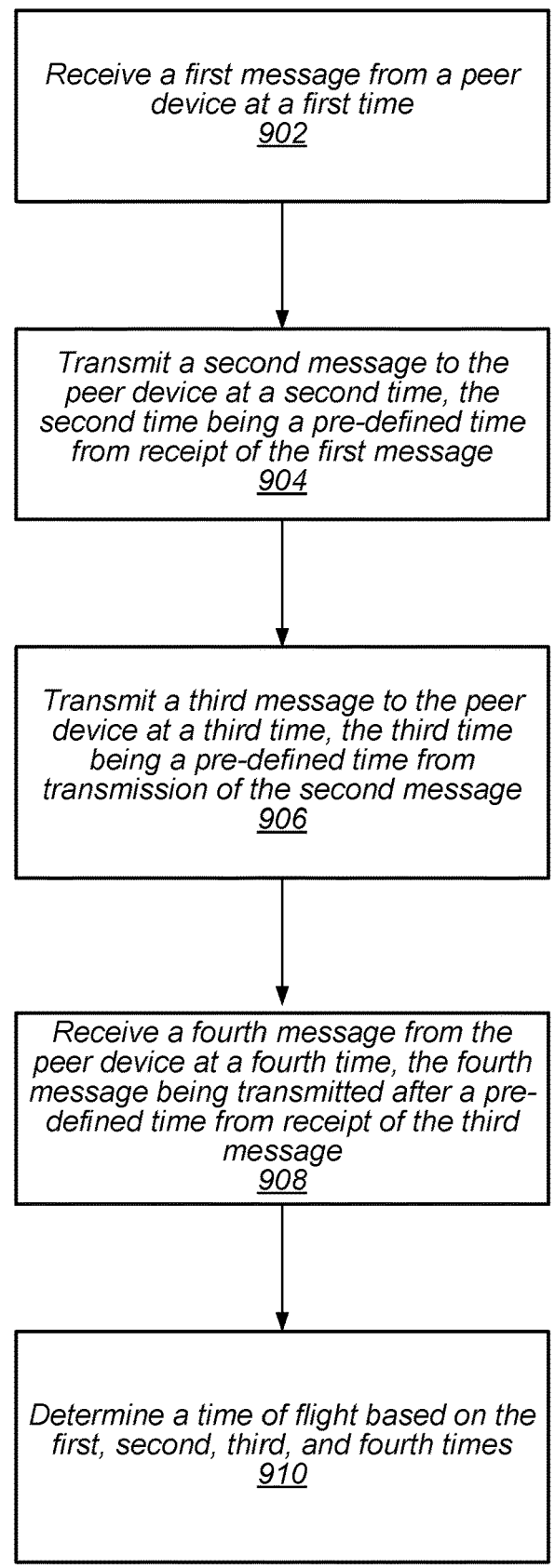
FIG. 9 illustrates a block diagram of another example of a method for a data-less ranging procedure, according to some embodiments.

FIG. 9 illustrates a block diagram of another example of a method for a data-less ranging procedure, according to some embodiments. The method shown in FIG. 9 may be used in conjunction with any of the signaling, methods, systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a device (e.g., wireless device 100) may receive a first message from a peer (e.g., neighboring) device (e.g., another wireless device 100). The first message may be received at a first instance in time (e.g., a first time). The first message may be a polling message, e.g., as described above. In some embodiments, the first message may include an indication that the first message is intended for the device. In other words, the first message may include information indicating that the message is intended for the device.

At 904, the device may transmit a second message to the peer device at a second instance in time (e.g., after the first instance in time). The second message may be transmitted after expiration of a time period. The time period may be pre-defined (e.g., via a standardization of the time period and/or via a negotiation of the time period prior to transmission of the first message). The duration of the time period may be from receipt of the first message to transmission of the second message. In some embodiments, the second message may be a response message. In some embodiments, the second message may include an indication that the second message is intended for the peer device. In other words, the second message may include information indicating that the message is intended for the peer device. In some embodiments, the device may adjust a transmission interval of a local clock of the device based on the second instance in time. For example, the transmission interval may be adjusted such that transmission of the second message occurs at a transmission interval. In other words, the transmission interval may be adjusted based on when the first message was received and when the second message may be transmitted (e.g., the time period between receipt of the first message and transmission of the second message). In some embodiments, the adjustment may be one of modifying a pulse shape of the local clock and/or adding an offset to a pulse shape of the local clock.

At 906, the device may transmit a third message to the peer device at a third instance in time (e.g., after the second instance in time). The third message may be transmitted after expiration of a time period. The time period may be pre-defined (e.g., via a standardization of the time period and/or via a negotiation of the time period prior to transmission of the first message). The duration of the time period may be from transmission of the second message to transmission of the third message. In some embodiments, the third message may be a response message. In some embodiments, the third message may include an indication that the third message is intended for the peer device. In other words, the third message may include information indicating that the message is intended for the peer device.

At 908, the device may receive a fourth message from the peer device at a fourth instance in time (e.g., after the third instance in time). The fourth message may be transmitted after expiration of a time period. The time period may be pre-defined (e.g., via a standardization of the time period and/or via a negotiation of the time period prior to transmission of the first message) and/or related to prior time periods (e.g., associated with transmission of the second and/or third messages). The duration of the time period may be from receipt (by the peer device) of the third message to transmission of the fourth message. In some embodiments, the fourth message may be a response message. In some embodiments, the fourth message may include an indication that the third message is intended for the device. In other words, the fourth message may include information indicating that the message is intended for the device.

At 910, the device may determine, based, at least in part, on the first, second, third, and fourth instances in time, a time of flight between the device and the peer device. In some embodiments, the time of flight may be calculated using an estimated local clock difference between the device and the peer device and the first, second, and fourth instances of time, e.g., as described above with reference to equations (4)-(14).

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory; and
at least one processor in communication with the memory, wherein the at least one processor is configured to:
  at a first instance in time, receive, from a neighboring wireless device, a polling message, wherein the polling message includes an indication that the polling message is intended for a wireless device associated with the apparatus;
  at a second instance in time, generate instructions to transmit a first response message to the neighboring wireless device, wherein the first response message is transmitted at an expiration of a first pre-determined time period, wherein the first pre-determined time period is measured from the first instance in time;
  at a third instance in time, generate instructions to transmit a second response message to the neighboring wireless device, wherein the second response message is transmitted at an expiration of a second pre-determined time period, wherein the second pre-determined time period is measured from the second instance in time;
  at a fourth instance in time, receive, from the neighboring wireless device, a third response message, wherein the third response message is transmitted after an expiration of a third pre-determined time period, wherein the third pre-determined time period starts upon receipt of the second response message; and
  determine, based, at least in part, on the first, second, third, and fourth instances in times, a time of flight between the wireless device and the neighboring wireless device.

2. The apparatus of claim 1, wherein the first pre-determined time period and the second pre-determined time period are equivalent.

3. The apparatus of claim 1, wherein the third pre-determined time period is based, at least in part, on the first and second pre-determined time periods.

4. The apparatus of claim 1, wherein the at least one processor is further configured to:
  adjust a transmission interval of a local clock such that the transmission interval aligns with at least one of the first pre-determined time-period and the second pre-determined time period.

5. The apparatus of claim 4, wherein, to adjust the transmission interval, the at least one processor is further configured to perform at least one of:
  modifying a pulse shape of the local clock; and
  adding an offset to a pulse shape of the local clock.

6. The apparatus of claim 4, wherein, to determine the time of flight, the at least one processor is further configured to:
  calculate the time of flight using an estimated local clock difference between the wireless device and the neighboring wireless device and the first, second, and fourth instances in time.

7. The apparatus of claim 1, wherein the at least one processor is further configured to:
  negotiate, prior to receiving the polling message, the first pre-determined time period and the second pre-determined time period.

8. A wireless device, comprising:
at least one antenna;
at least one radio communicatively coupled to the antenna and configured to perform wireless communications according to at least one radio access technology (RAT);
at least one processor communicatively coupled to the at least one radio, wherein the wireless device is configured to perform voice and/or data communications;
wherein the at least one processor is configured to cause the wireless device to:
  receive, at a first time, a first message from a neighboring wireless device;
  transmit, at a second time, a second message to the neighboring wireless device, wherein the second message is transmitted at an expiration of a first pre-determined time period, wherein the first pre-determined time period starts upon receipt of the first message;
  transmit, at a third time, a third message to the neighboring wireless device, wherein the third message is transmitted at an expiration of a second pre-determined time period, wherein the second pre-determined time period starts upon transmission of the second message;
  receive, at a fourth time, a fourth message from the neighboring wireless device, wherein the fourth message is transmitted after an expiration of a third pre-determined time period, wherein the third pre-determined time period starts upon receipt of the third message; and
  determine, based, at least in part, on the first, second, third, and fourth times, a time of flight between the wireless device and the neighboring wireless device.

9. The wireless device of claim 8, wherein the first message includes an indication that the first message is intended for the wireless device.

10. The wireless device of claim 8, wherein, to determine the time of flight, the at least one processor is further configured to:
  calculate the time of flight using an estimated local clock difference between the wireless device and the neighboring wireless device and the first, second, and fourth times.

11. The wireless device of claim 8, wherein the at least one processor is further configured to:
  adjust a transmission interval of a local clock such that the transmission interval aligns with at least one of the first pre-determined time-period and the second pre-determined time period; and
wherein, to adjust the transmission interval, the at least one processor is further configured to perform at least one of:
  modifying a pulse shape of the local clock; or
  adding an offset to a pulse shape of the local clock.

12. The wireless device of claim 8, wherein the first pre-determined time period and the second pre-determined time period are equivalent.

13. The wireless device of claim 8, wherein the third pre-determined time period is based, at least in part, on the first and second pre-determined time periods.

14. The wireless device of claim 8, wherein the at least one processor is further configured to:

negotiate, prior to receiving the first message, the first pre-determined time period and the second pre-determined time period.

15. The wireless device of claim 8, wherein the first message comprises a polling message.

16. A non-transitory computer readable memory medium storing program instructions executable by a processor of a wireless device to:
receive, at a first time, a first message from a neighboring wireless device, wherein the first message comprises a polling message;
transmit, at a second time, a second message to the neighboring wireless device, wherein the second message is transmitted at an expiration of a first pre-determined time period, wherein the first pre-determined time period starts upon receipt of the first message;
transmit, at a third time, a third message to the neighboring wireless device, wherein the third message is transmitted at an expiration of a second pre-determined time period, wherein the second pre-determined time period starts upon transmission of the second message;
receive, at a fourth time, a fourth message from the neighboring wireless device, wherein the fourth message is transmitted after an expiration of a third pre-determined time period, wherein the third pre-determined time period starts upon receipt of the third message; and
determine, based, at least in part, on the first, second, third, and fourth times, a time of flight between the wireless device and the neighboring wireless device.

17. The non-transitory computer readable memory medium of claim 16, wherein the first message includes an indication that the first message is intended for the wireless device.

18. The non-transitory computer readable memory medium of claim 16,
wherein, to determine the time of flight, the program instructions are further executable by the processor of the wireless device to:
calculate the time of flight using an estimated local clock difference between the wireless device and the neighboring wireless device and the first, second, and fourth times.

19. The non-transitory computer readable memory medium of claim 16,
wherein the program instructions are further executable by the processor of the wireless device to:
adjust a transmission interval of a local clock such that the transmission interval aligns with at least one of the first pre-determined time-period and the second pre-determined time period; and
wherein, to adjust the transmission interval, the program instructions are further executable by the processor of the wireless device to perform at least one of:
modifying a pulse shape of the local clock; or
adding an offset to a pulse shape of the local clock.

20. The non-transitory computer readable memory medium of claim 16,
wherein the first pre-determined time period and the second pre-determined time period are equivalent; and
wherein the third pre-determined time period is based, at least in part, on the first and second pre-determined time periods.

* * * * *